(12) United States Patent
Watabe et al.

(10) Patent No.: US 11,661,015 B2
(45) Date of Patent: May 30, 2023

(54) HOLDING MECHANISM AND HOLDING DEVICE

(71) Applicant: PIONEER CORPORATION, Tokyo (JP)

(72) Inventors: Takashi Watabe, Kawagoe (JP); Hironori Shigeta, Kawagoe (JP); Hirofumi Matsumura, Kawagoe (JP)

(73) Assignee: PIONEER CORPORATION, Tokyo (JP)

(*) Notice: Subject to any disclaimer, the term of this patent is extended or adjusted under 35 U.S.C. 154(b) by 14 days.

(21) Appl. No.: 17/305,684

(22) Filed: Jul. 13, 2021

(65) Prior Publication Data

US 2021/0339684 A1    Nov. 4, 2021

Related U.S. Application Data

(62) Division of application No. 16/617,618, filed as application No. PCT/JP2018/020107 on May 25, 2018, now Pat. No. 11,097,665.

(30) Foreign Application Priority Data

Jun. 1, 2017   (JP) .................................. 2017-109387

(51) Int. Cl.
   *B60R 11/02*   (2006.01)
   *B60R 11/00*   (2006.01)

(52) U.S. Cl.
   CPC ....... *B60R 11/02* (2013.01); *B60R 2011/0005* (2013.01); *B60R 2011/0084* (2013.01); *B60R 2011/0087* (2013.01)

(58) Field of Classification Search
   CPC ............. B60R 11/02; B60R 2011/0005; B60R 2011/0084; B60R 2011/0087
   See application file for complete search history.

(56) References Cited

U.S. PATENT DOCUMENTS

| 5,033,709 A | 7/1991 | Yuen |
| 5,179,590 A | 1/1993 | Wang |

(Continued)

FOREIGN PATENT DOCUMENTS

| CA | 2903424 A1 | 11/2014 |
| EP | 3244283 A1 | 11/2017 |

(Continued)

OTHER PUBLICATIONS

International Search Report, dated Aug. 21, 2018, from corresponding PCT application No. PCT/JP2018/020107.

(Continued)

*Primary Examiner* — Brian D Nash
(74) *Attorney, Agent, or Firm* — Nixon & Vanderhye

(57) ABSTRACT

A holding mechanism prevents a device at a back side of a held object from being hidden by the object. Even if a large smartphone is held, clamping with a fixed clamping part and a movable clamping part prevents the fixed part from being moved, wherein a device located back of the smartphone and at the side of the fixed clamping part cannot be hidden by the smartphone. Due to the movable clamping part being movable farther from a rotation axis than the fixed clamping part, a middle portion of the smartphone in the clamping direction substantially coincides with the rotation axis when holding a smartphone with a specified width, wherein the smartphone cannot be easily moved in a Y- and Z-direction when rotating a holding part to change orientation, and also at the back side, a device located at the side of the clamp cannot be easily hidden.

12 Claims, 4 Drawing Sheets

(56) References Cited

U.S. PATENT DOCUMENTS

| | | | |
|---|---|---|---|
| 5,362,025 | A | 11/1994 | Trom et al. |
| 6,229,891 | B1 | 5/2001 | Chen |
| 6,418,010 | B1 | 7/2002 | Sawyer |
| 7,712,720 | B1 | 5/2010 | Cheng et al. |
| 8,091,850 | B2 | 1/2012 | Carnevali |
| 8,240,628 | B2 | 8/2012 | Huang |
| D690,707 | S | 10/2013 | Minn et al. |
| 8,864,089 | B2 | 10/2014 | Hung |
| D739,410 | S | 9/2015 | Chun |
| 10,118,565 | B2 | 11/2018 | Kim |
| 10,272,847 | B1 | 4/2019 | Fan |
| 10,315,585 | B2 | 6/2019 | Minn et al. |
| 10,598,199 | B1 * | 3/2020 | Fan ..................... F16M 13/022 |
| 10,800,307 | B1 * | 10/2020 | Zhou ....................... B60N 2/99 |
| 2004/0179678 | A1 | 9/2004 | Hsu Li |
| 2008/0070641 | A1 | 3/2008 | Wang |
| 2008/0169393 | A1 | 7/2008 | Wang et al. |
| 2008/0203260 | A1 | 8/2008 | Carnevali |
| 2012/0006870 | A1 * | 1/2012 | Proctor .................. B60R 11/02 224/275 |
| 2012/0049558 | A1 | 3/2012 | Souillac |
| 2012/0126083 | A1 | 5/2012 | Nemoto |
| 2012/0175474 | A1 | 7/2012 | Barnard et al. |
| 2012/0199621 | A1 | 8/2012 | Yoon |
| 2013/0037590 | A1 | 2/2013 | Yoon |
| 2014/0097306 | A1 | 4/2014 | Hale et al. |
| 2014/0103087 | A1 | 4/2014 | Fan |
| 2014/0138419 | A1 | 5/2014 | Minn et al. |
| 2014/0354002 | A1 | 12/2014 | Bisceglia et al. |
| 2015/0274088 | A1 | 10/2015 | Minn et al. |
| 2015/0300050 | A1 | 10/2015 | Van Balen |
| 2016/0280098 | A1 * | 9/2016 | Frye ........................ B60N 2/08 |
| 2016/0318426 | A1 * | 11/2016 | Aita ....................... B60N 2/065 |
| 2019/0037722 | A1 | 1/2019 | Maisenbacher et al. |
| 2019/0263326 | A1 | 8/2019 | Yu |
| 2020/0172018 | A1 * | 6/2020 | Watabe ................... H04M 1/12 |
| 2022/0169164 | A1 * | 6/2022 | Migneco ................ B60N 2/914 |
| 2022/0219640 | A1 * | 7/2022 | Bittner ..................... B60N 2/10 |

FOREIGN PATENT DOCUMENTS

| | | |
|---|---|---|
| JP | 2012-140035 A | 7/2012 |
| JP | 2013-256240 A | 12/2013 |
| JP | 3201014 U | 11/2015 |
| JP | 2016-513218 A | 5/2016 |
| JP | 2017-056852 A | 3/2017 |

OTHER PUBLICATIONS

Office Action issued in Japanese Patent Application No. 2019-522180 dated Aug. 18, 2020 with English translation provided.

Official on-vehicle holder Easy One Touch 2 emergency single touch 2 Smart Tap smart taps, search date : Jul. 3, 2020 URL: https://sm-tap.com/lp/html/easyonetouch2_02sp.html (English explanation of relevance discussed in Japanese Office Action).

Amazon|Smart Tap Autohold type On-vehicle holder EasyOneTouch2, search date : Jul. 3, 2020 URL: https://www.amazon.co.jp/SmartTap-%E3%82%AA%E3%83%BC%E3%83%88%E3%83%9B%E3%83%BC%E3%83%AB%E3%83%89%E5%BC%8F-%E8%BB%8A%E8%BC%89%E3%83%9B%E3%83%AB%E3%83%80%E3%83%BC-EasyOneTouch2-HLCRIO121/dp/B015C4UEIG(English explanation of relevance discussed in Japanese Office Action and machine translation).

* cited by examiner

HOLDING MECHANISM AND HOLDING DEVICE

CROSS-REFERENCE TO RELATED APPLICATIONS

This application is a divisional of U.S. Ser. No. 16/617,618 filed Nov. 27, 2019, which is a National Stage Entry of International Patent Application No. PCT/JP2018/020107 filed May 25, 2018, which claims priority to JP Application No. 2017-109387 filed Jun. 1, 2017. Each of the previously noted applications is hereby incorporated by reference in their entirety.

BACKGROUND OF THE INVENTION

Technical Field

The present invention relates to a holding mechanism and a holding device.

Background Art

Conventionally, a mobile device holder for installing a mobile device such as a smartphone in a vehicle is proposed as a holding mechanism for holding a held object with a screen (see e.g. Patent Document 1). A conventional mobile device holder according to Patent Document 1 includes an attaching part mounted on a dashboard, an arm part extending from the attaching part, and a holding part provided on a tip of the arm part, the holding part configured to hold a mobile device, wherein an orientation of the mobile device is changeable by rotating the holding part.

CITATION LIST

Patent Literature

Patent Document 1: JP 2013-256240

SUMMARY OF THE INVENTION

A mobile device holder according to Patent Document 1 clamps a mobile device with a pair of clamping arms with elastic protrusions. For clamping, it is conceivable that the pair of clamping arms are movable and biased so as to bring the pair of clamping arms closer to each other for adapting to various sizes of mobile devices. In such a configuration, a middle portion of the mobile device can coincide with a rotation center since both of the clamping arms are movable, however, when holding a large size of mobile device, a device located at a back side of the mobile device, such as a display device, may be hidden.

Therefore, an objective of the present invention is for example to provide a holding mechanism which can prevent a device located at a back side of a held object from being hidden by the held object.

In order to achieve the above described objective, an inventive holding mechanism according to claim 1 includes a holding part for clamping a rectangular-plate-shaped held object in a short side direction, and a base part for supporting the holding part in a freely rotatable manner, wherein the holding part includes a holding plate part located at a back side of the held object, a fixed clamping part disposed on one side of the holding plate part, and a movable clamping part biased so as to approach the fixed clamping part, wherein the movable clamping part is, in a non-clamping state, located closer to a rotation center of the holding part than the fixed clamping part and movable farther away from the rotation center than the fixed clamping part.

DETAILED DESCRIPTION OF THE PREFERRED EMBODIMENTS

Figure 1:
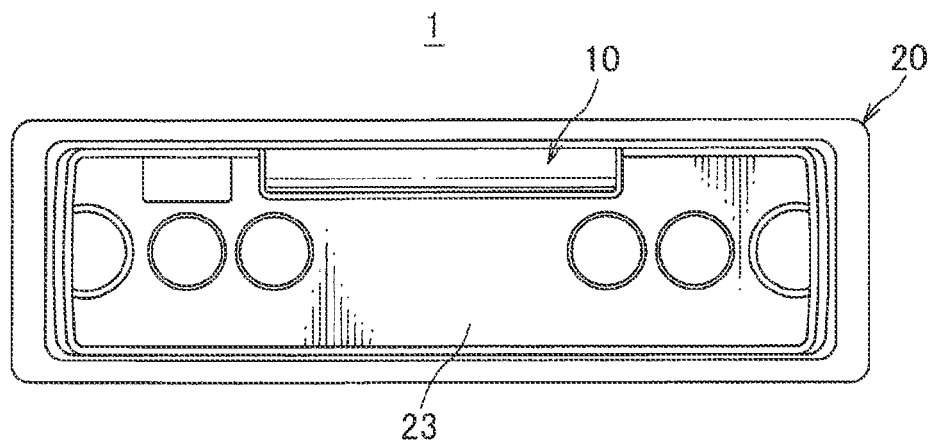
FIG. 1. is a front view of a holding device according to an example of the present invention.

Hereinafter, embodiments of the present invention shall be described. According to embodiments of the present invention, a holding mechanism includes a holding part for clamping a rectangular-plate-shaped held object in a short side direction, and a base part for supporting the holding part in a freely rotatable manner. The holding part includes a holding plate part located at a back side of the held object, a fixed clamping part disposed on one side of the holding plate part, and a movable clamping part biased so as to approach the fixed clamping part. The movable clamping part is, in a non-clamping state, located closer to a rotation center of the holding part than the fixed clamping part and movable farther away from the rotation center than the fixed clamping part.

By clamping the held object with the fixed clamping part and the movable clamping part, the fixed clamping part does not move even when clamping a held object with a large size in a clamping direction, and a device located at a back side of the held object and at the side of the fixed clamping part cannot be easily hidden by the held object. Furthermore, due to the movable clamping part being movable farther away from a rotation center than the fixed clamping part, a middle portion of the held object in the clamping direction substantially coincides with the rotation center when holding a held object with a specified dimension in the clamping direction (twice as large as a distance between the fixed clamping part and the rotation center). Thus, when changing an orientation of the held object by rotating the holding part, the held object cannot be easily moved in a right-left direction and in an up-down direction. Moreover, due to the movable clamping part being located closer to the rotation center than the fixed clamping part in a non-clamping state, a device located at the side of the movable clamping part and at the back side cannot be easily hidden when holding a held object with a width equal to or smaller than the above-mentioned specified dimension in the clamping direction. Here, the term "fixed clamping part" means that it is immovable in the clamping direction, wherein it may be movable in other directions.

Preferably, the rotation center of the holding part is located in a middle portion of the base part in a horizontal direction, wherein when clamping the held object in the horizontal direction, the fixed clamping part is located so as to overlap with an end edge of the base part at one side in the horizontal direction. In this manner, a device at the back side cannot be easily hidden by the held object at the one side when holding the held object in a vertical orientation. Furthermore, when holding a held object with a width similar to the base part in the vertical orientation, the movable clamping part overlaps with an end edge at the other side of the base part. Thus, the end edges of the base part and the held object are flush with each other at both sides in the horizontal direction so that improvement regarding the design can be achieved.

Preferably, the fixed clamping part is located substantially at the same height as a lower end or an upper end of the base part when clamping the held object in an up-down direction. This enables one side of the held object to be located along the lower or the upper end of the base part, wherein a device located below or above the base part cannot be easily hidden by the held object.

Preferably, the rotation center of the holding part is located in a middle portion of the holding plate part in a direction orthogonal to the clamping direction and separated in the clamping direction from the fixed clamping part by a distance equal to or larger than a half of an orthogonal dimension of the holding plate part. As a result, if the fixed clamping part is moved upwards when rotating the held object so as to be clamped in the horizontal direction, with the held object being clamped in the up-down direction, a lower end of the holding plate part after rotation is not located below the fixed clamping part before rotation. Furthermore, if the fixed clamping part is moved downwards during rotation, an upper end of the holding plate part after rotation is not located above the fixed clamping part before rotation. Thus, a device located below or above the holding plate part cannot be easily hidden by the holding plate part.

Preferably, at least one of the fixed clamping part and the movable clamping part has a plurality of stoppers which are provided so as to be freely slidable along an end edge of the held object. In this manner, the held object can be clamped stably by sliding the stoppers depending on the dimension of the held object.

The holding part may hold a mobile device as the held object. The term "mobile device" as used here refers to an electronic device which is portable by a user, and may include a smartphone, a tablet terminal and a game device, for example.

According to embodiments of the present invention, the holding device includes a holding mechanism and a device main body for attaching the holding mechanism to an object. The holding mechanism includes a sliding part supported by the device main body so as to freely slide in and out, wherein the base part is supported by the sliding part so that a standing angle of the holding part is changeable. The base part may be accommodated in the device main body with the clamping direction coinciding with a sliding-in-and-out direction when being tilted so as to extend along the sliding-in-and-out direction, or may be accommodated in the device main body with the clamping direction being orthogonal to the sliding-in-and-out direction.

The holding device may be provided at an instrument panel for a vehicle.

Example Embodiment

In the following, an example embodiment of the present invention shall be described in more details with reference to the drawings. A holding device according to the present example is an in-vehicle device and mounted on an instrument panel at a driver seat of a vehicle for use. Furthermore, the holding device according to the present example holds, as a held object with a rectangular plate shape to be held, a smartphone which is an example for a mobile device.

Figure 2:
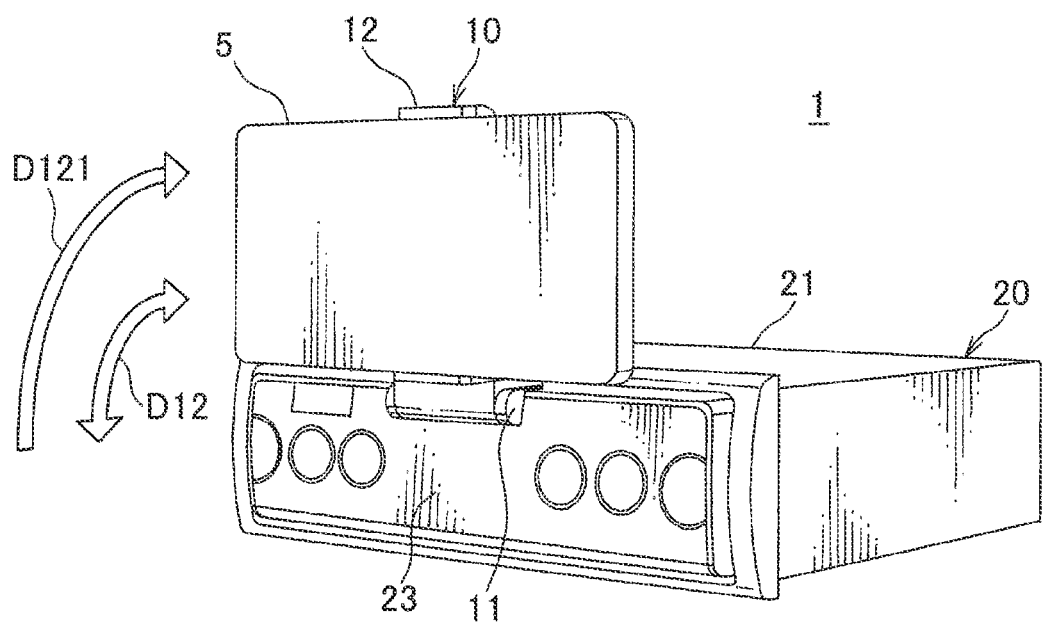
FIG. 2. is a perspective view showing how a held object is held by the holding device.
Figure 3:
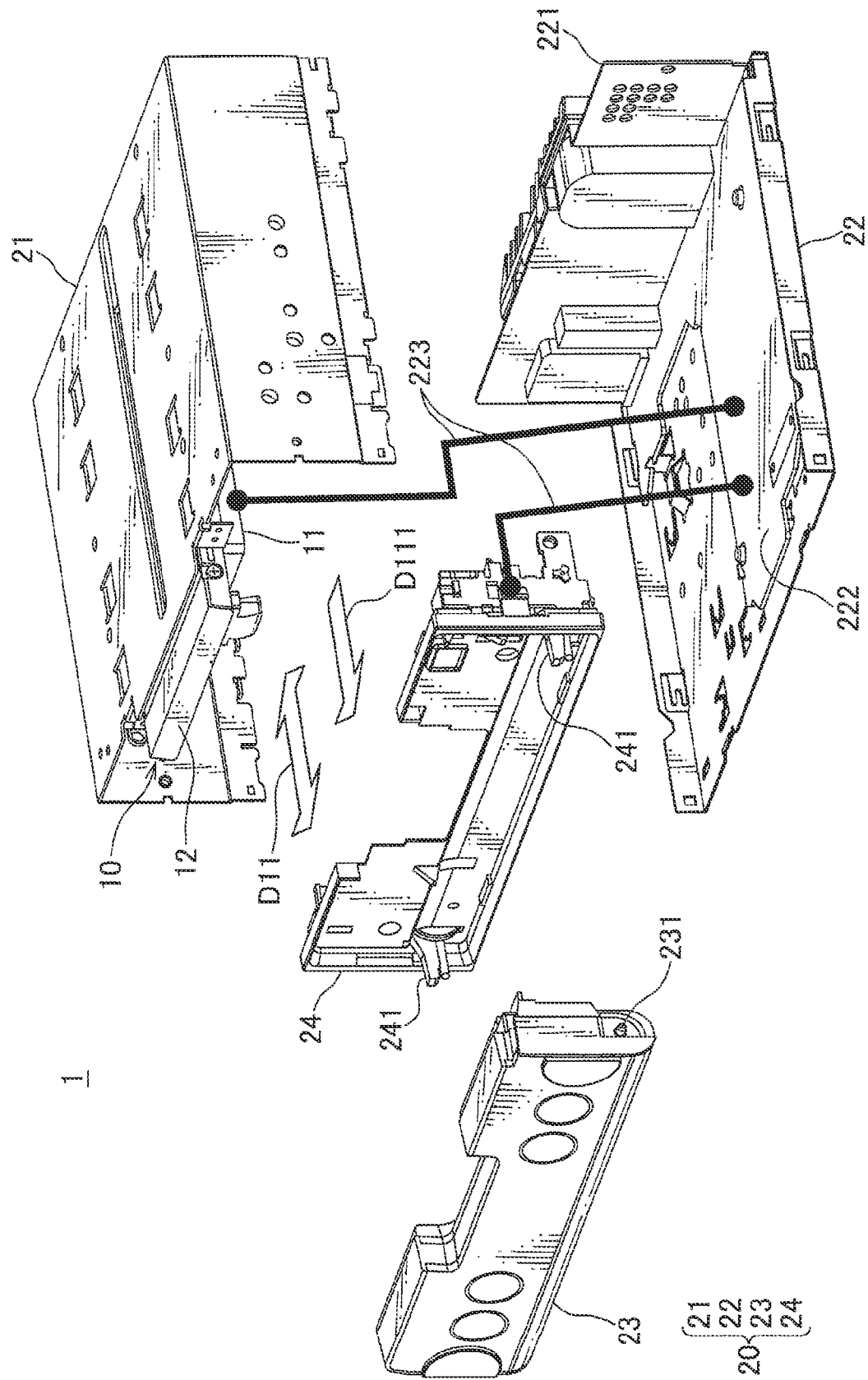
FIG. 3. is an exploded perspective view showing the holding device.

As shown in FIGS. 1-3, the holding device 1 according to the present example includes a holding mechanism 10 for a smartphone 5, and a device main body 20 with a rectangular box shape to be mounted on an instrument panel.

The holding mechanism 10 is held by the device main body 20 so as to freely project and retract. Furthermore, the holding mechanism 10 includes a sliding part 11 supported by the device main body 20 so as to freely slide in and out, and a tilting part 12 pivotably supported on the sliding part 11 and configured to hold the smartphone 5. When holding the smartphone 5 by the holding mechanism 10, the sliding part 11 is drawn out of the device main body 20 in a projecting direction D111 in a projecting and retracting direction D11 as shown in FIG. 3, and the tilting part 12 is erected in a standing direction D121 in a rotating direction D12 as shown in FIG. 2. The tilting part 12 has a base part 3 and a holding part 4 as described below, and is supported by the sliding part 11 so that a standing angle of the holding part 4 is changeable. And it is configured that the smartphone 5 is held by this erected tilting part 12.

The device main body 20 includes an upper chassis 21 constituting an upper wall and a pair of side walls of the rectangular box-shaped device main body 20, and a lower chassis 22 constituting a lower wall. The sliding part 11 of the above-described holding mechanism 10 is supported on the upper wall of the upper chassis 21 so as to freely slide in and out. At the lower chassis 22, a rectangular-shaped back base plate 221 is erected from one end side on a back side of the rectangular box-shaped device main body 20, the back base plate 221 constituting a back wall of the device main body 20. This back base plate 221 is equipped with connectors of various types for connection with an external device, and/or an antenna and such for performing a short-distance communication according to, for example, Bluetooth (registered trademark) standard and such, with the smartphone 5. Further, an inner base plate 222 electrically connected to the back base plate 221 is attached to an inner face of the lower chassis 22.

Further, the device main body 20 includes a rectangular plate-shaped, detachable front panel part 23 constituting a front wall of the device main body 20 and having a function of a user interface, and a panel part 24 configured to hold the front panel part 23 in a freely detachable and freely rotatable manner. The panel part 24 is fixed to the upper chassis 21 and the lower chassis 22. This panel part 24 is formed into a shape having a cutout, so as not to interfere with the holding mechanism 10 supported on the upper chassis 21. A pair of shaft protrusions 231 providing a rotation axis is provided on both ends of the front panel part 23 in a longitudinal direction, and this pair of shaft protrusions 231 is held by a pair of holding arms 241 at the panel part 24 in a freely detachable and freely rotatable manner.

In the holding device 1 according to the present example, each of the panel part 24 and the holding mechanism 10 supported on the upper chassis 21 is electrically connected to the inner base plate 222 of the lower chassis 22 via a cable 223. According to the present example, touch operation for the smartphone 5 held as shown in FIG. 2 and button operation for the front panel part 23 can display map information on a screen of the smartphone 5 and can play music from an in-vehicle audio device, for example. Also, the held smartphone 5 can be charged via the cable 223 connecting the holding mechanism 10 and the inner base plate 222, and a charge cable extending from the smartphone 5 and connected to the holding mechanism 10.

The smartphone 5 is held by the holding device 1 as described above according to the following procedure.

Figure 4:
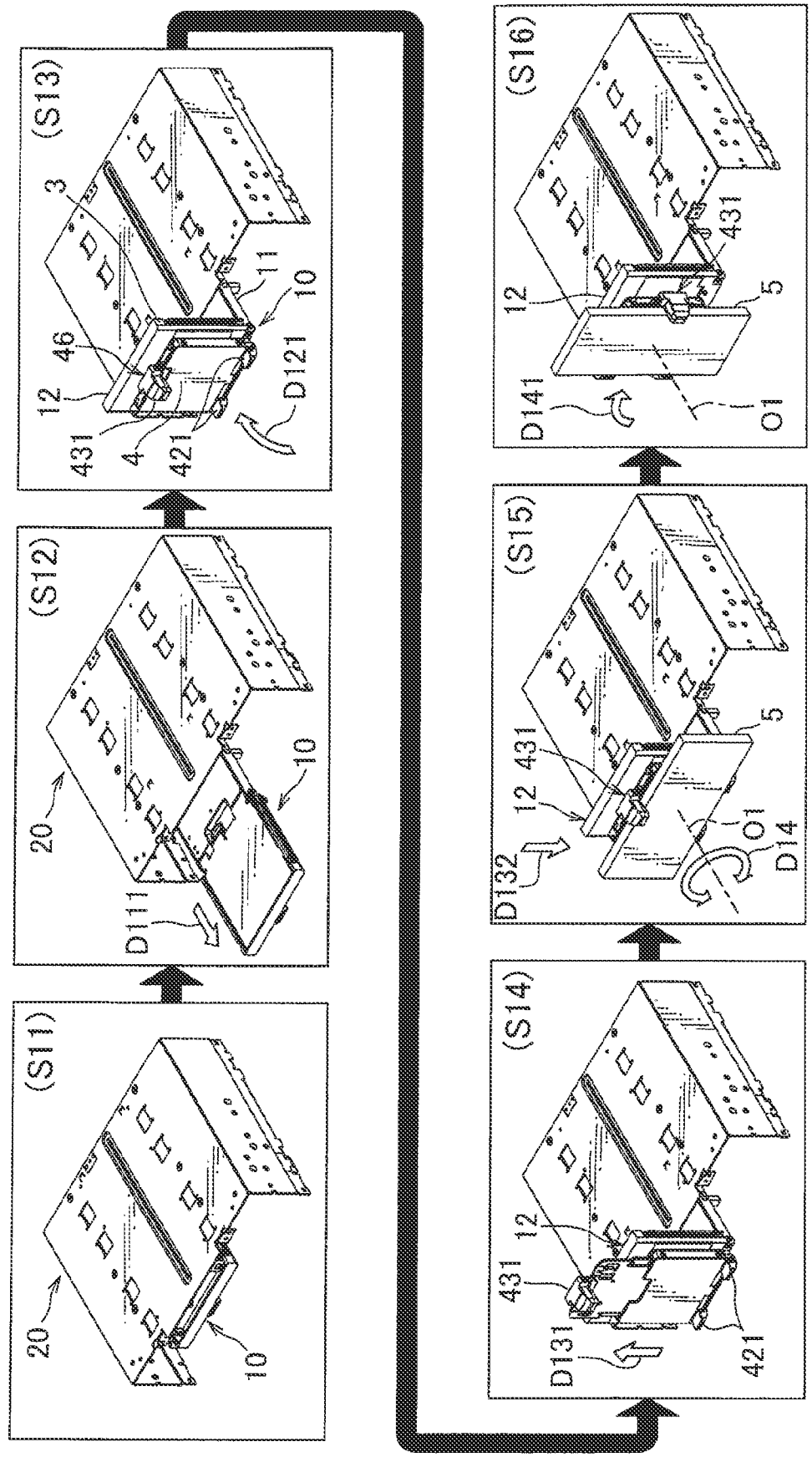
FIG. 4. is a perspective view showing operation of the holding device.

FIG. 4 is a schematic diagram illustrating one exemplary procedure to make the smartphone held by the holding device shown in FIG. 1 to FIG. 3. In FIG. 4, with respect to the device main body 20, only the upper chassis 21 is shown for more simplicity. The procedure explained below is performed manually by a user.

Firstly, in step S11 and step S12, the holding mechanism 10 is drawn out of the device main body 20 in the projecting direction D111. At this time, according to the present example, the front panel part 23 is either rotated around the shaft protrusions 231 shown in FIG. 3 as a rotation center and tilted forward, or removed from the panel part 24, so as not to obstruct the movement of the holding mechanism 10. Further at this time, holding claws 421 and 431 as described below are opposed (i.e. aligned) to each other in a drawing-out direction in the holding mechanism 10. This means that the holding mechanism 10 is configured to be accommodated into the device main body 20, with the clamping direction of the holding mechanism 10 coinciding with the sliding-in-and-out direction of the sliding part 11.

In a following step S13, the tilting part 12 is erected in the holding mechanism 10 in the standing direction D121 from the sliding part 11. Here, the tilting part 12 includes a base part 3 pivotably supported by the sliding part 11 and a holding part 4 supported by the base part 3 in a freely rotatable manner, wherein a chucking mechanism 46 is formed by totally three holding claws 421 and 431 in the holding part 4. According to the present example, in an erected state of the tilting part 12 in this step S13, the chucking mechanism 46 takes such a pose that one holding claw 431 is located at an upper side and two holding claws 421 are located at a lower side. Furthermore, for the chucking mechanism 46, the one holding claw 431 located on the upper side is biased by a spring toward the two holding claws 421 located on the lower side.

In a step S14, the holding claw 431 located on the upper side is raised in a raising direction D131 against biasing by the spring in the chucking mechanism 46.

And in a step S15, the smartphone 5 is placed between the holding claw 431 raised as described above at the upper side and the holding claws 421 at the lower side in a horizontal orientation where its longitudinal direction oriented in the horizontal direction. When the user releases the holding claw 431 at the upper side, the holding claw 431 at the upper side moves in a downward direction D132 via the spring biasing as described above. In this manner, the smartphone 5 is clamped by the holding claw 431 at the upper side and the holding claws 421 at the lower side.

Here, according to the present example, the holding part 4 with the chucking mechanism 46 is attached to the tilting part 12 in a freely rotatable manner in a rotating direction D14 around a rotation axis O1 extending along a direction perpendicular to a surface of a screen of the smartphone 5. As described above, within the step S15, the smartphone 5 is held in the horizontal orientation (with its longitudinal direction oriented in the horizontal direction). When the user wants to watch a display of this smartphone 5 with the smartphone 5 in a vertical orientation (with its longitudinal direction oriented in an up-down direction), the smartphone 5 may stand in the vertical orientation according to a following step S16. I.e., in the step S16, the chucking mechanism 46 is rotated together with the smartphone 5 clockwise in the figure by 90 degrees around the rotation axis O1. With this rotation, the smartphone 5 stands in the vertical orientation. Furthermore, when the user thereafter wants to watch the display with the smartphone 5 in the horizontal orientation, the chucking mechanism 46 is returned counterclockwise in the figure by 90 degrees so that the smartphone 5 is positioned in the horizontal orientation.

Moreover, according to the present example, the user returns the front panel part 23 at any time after drawing out the holding mechanism 10. As a result, an appearance after completing holding the smartphone 5 looks e.g. as shown in FIG. 2. When the smartphone 5 is detached and the holding mechanism 10 is accommodated into the device main body 20, the holding mechanism 10 is accommodated according to an inverted procedure to the procedure as shown in FIG. 4.

Now, a detailed shape of the holding part 4 will be described. Hereinafter, a front-back direction (travel direction) of a vehicle shall be an X-direction, a vehicle width direction (right-left direction) shall be a Y-direction, an up-down direction shall be a Z-direction, wherein the holding device 1 shall hold the smartphone 5, with the smartphone 5 being oriented towards a rear side in the X-direction (i.e. with the screen extending along a YZ-plane). Further, a short side direction of the rectangular-shaped smartphone 5 shall be a width direction.

Figure 5:
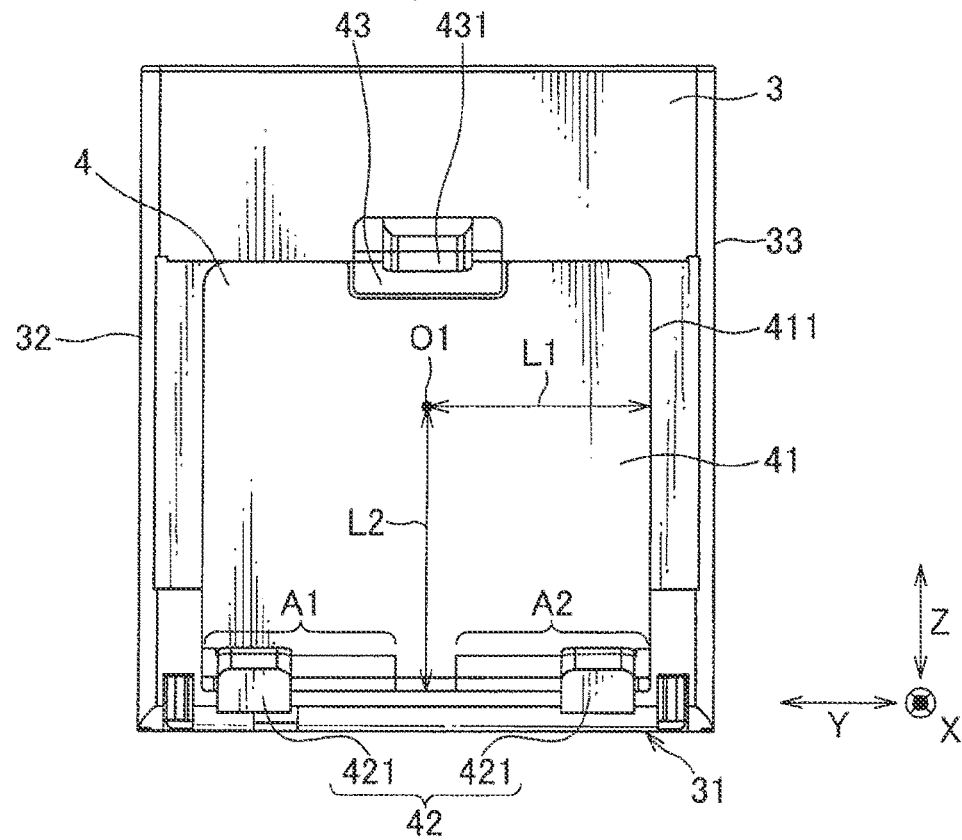
FIG. 5. is a front view showing a holding mechanism of the holding device.

As shown in FIG. 5, the holding part 4 includes a holding plate part 41 with a rectangular-plate shape located at the back side of the smartphone 5 and extending along the YZ-plane, a fixed clamping part 42 disposed on one side of the holding plate part 41, a movable clamping part 43 with a holding claw 431 which is overlapped with a back surface of the holding plate part 41, and a biasing device for biasing the movable clamping part 43 so as to approach the fixed clamping part 42. FIG. 5 shows a state of the holding part 4 which is not holding a smartphone 5 (a state in the above described step S13), wherein dimensions and positional relations of the elements are stated in relation to this state as a reference unless otherwise explained.

The fixed clamping part 42 is constituted of two holding claws 421. The two holding claws 421 are aligned along an outer edge of the holding plate part 41 and freely slidable, wherein the holding claws 421 slide along an end edge of the smartphone 5 and serve as stoppers. Furthermore, the two holding claws 421 are individually freely slidable within ranges A1 and A2, respectively, wherein in the most closely approaching state, they are spaced with a predetermined distance from each other, while in the farthest separated state, the two holding claws 421 are located at corners of the holding plate part 41. Moreover, the fixed clamping part 42 is located, in the state shown in FIG. 5, substantially at the same height as (a similar height to or slightly above) a lower end 31 of the base part 3.

A rotation axis (rotation center) O1 at which the holding part 4 is pivotably supported by the base part 3 is located in a middle portion of the rectangular-plate-shaped base part 3 in the Y-direction. Furthermore, in a non-clamping state in which a smartphone 5 is not held, the rotation axis O1 is located closer to the movable clamping part 43 than the fixed clamping part 42. Moreover, the rotation axis O1 is located in a middle portion of the holding plate part 41 in a direction (Y-direction) orthogonal to a clamping direction (Z-direction) of the clamping parts 42 and 43. Here, a half of a dimension of holding plate part 41 in the above-mentioned orthogonal direction (i.e. a distance in the Y-direction from the rotation axis O1 to an end edge 411 of the holding plate part 41) shall be indicated by L1, wherein a distance in the Z-direction from the rotation axis O1 to the fixed clamping part 42 shall be indicated by L2. According to the present example, the distance L2 is longer than the distance L1.

Further, the distance L2 is substantially a half of the width of the smartphone 5 with a specified size (e.g. 5 inches) and also substantially a half of the dimension of the base part 3 in the Y-direction. This means that the dimension of the base part 3 in the Y-direction is substantially equal to the width of the smartphone 5 with the specified size.

The movable clamping part 43 has a movable range in which the smartphone 5 with a specified size (twice as large as the distance L2) can be clamped, wherein the movable clamping part 43 is movable farther away from the rotation axis O1 than the fixed clamping part 42. I.e., in the non-clamping state, a distance between the fixed clamping part 42 and the rotation axis O1 is larger than a distance between the movable clamping part 43 and the rotation axis O1, and the movable clamping part 43 is movable such that the distance from the rotation axis O1 is larger than the distance between the fixed clamping part 42 and the rotation axis O1. Furthermore, when clamping the smartphone 5 with the specified width by the clamping parts 42 and 43, a middle portion of the smartphone 5 in the clamping direction substantially coincides with the rotation axis O1.

When the movable clamping part 43 is moved in order to clamp the smartphone 5 with the specified size by such a holding part 4, the rotation axis O1 is located in the middle between the fixed clamping part 42 and the movable clamping part 43, wherein a middle portion of the smartphone 5 in the width direction substantially coincides with the rotation axis O1.

Figure 6:
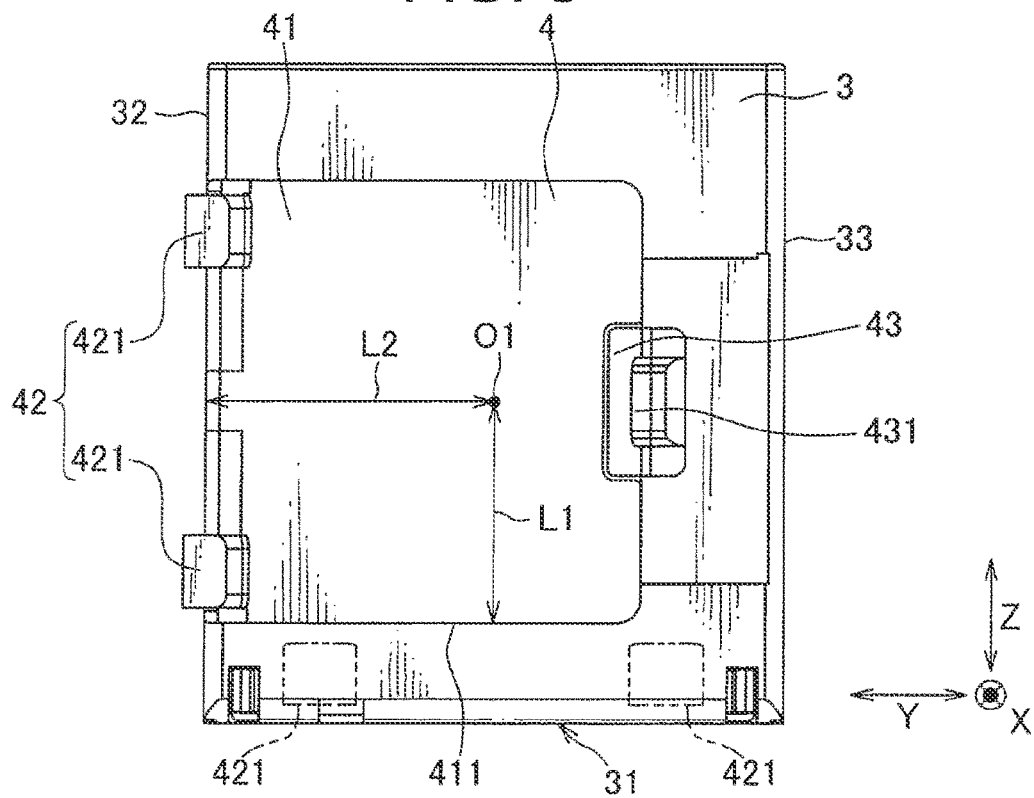
FIG. 6. is a front view showing how a holding part of the holding mechanism is rotated.

FIG. 6 shows how the holding part 4 is rotated by substantially 90 degrees (a state in the above-mentioned step S16) from the state shown in FIG. 5. At this time, the fixed clamping part 42 is overlapped with an end edge 32 of the base part 3 in the Y-direction. Furthermore, since the distance L2 is larger than the distance L1, the end edge 411 of the holding plate part 41 after rotation is located in the Z-direction above the fixed clamping part 42 before rotation.

In the state shown in FIG. 6, since the distance L2 is substantially a half of the width of the smartphone 5, wherein the rotation axis O1 is located in the middle portion of the base part 3 in Y-direction and the fixed clamping part 42 is overlapped with the end edge 32 of the base part 3, the movable clamping part 43 is overlapped with an end edge 33 at the other side when clamping the smartphone 5 with the specified size, and middle portions of the smartphone 5 and the base part 3 in the Y-direction substantially coincide with each other. Additionally, end edges of the base part 3 and the smartphone 5 with the specified size at both sides in the Y-direction are flush with each other.

With the above-described configuration, even if a smartphone with a large dimension in the clamping direction is held, clamping the smartphone 5 with the fixed clamping part 42 and the movable clamping part 43 prevents the fixed clamping part 42 from being moved, wherein a device located at a back side of the smartphone 5 and at the side of the fixed clamping part 42 cannot be easily hidden by the smartphone 5. Additionally, due to the movable clamping part 43 being movable farther away from the rotation axis O1 than the fixed clamping part 42, the smartphone 5 with the specified width (twice as large as the distance L2) can be held. By holding such a smartphone 5, the middle portion of the smartphone 5 in the clamping direction substantially coincides with the rotation axis O1. On the other hand, in case that the middle portion of the smartphone is located below the rotation axis e.g. when the smartphone is being clamped in the up-down direction and held in the horizontal orientation, the smartphone is entirely moved to the left side if the smartphone should be rotated clockwise to a vertical orientation. According to the present example, due to the middle portion of the smartphone 5 in the clamping direction substantially coinciding with the rotation axis O1, the smartphone 5 cannot be easily moved in the Y-direction and Z-direction when rotating the holding part 4 to change the orientation of the smartphone 5.

Furthermore, due to the movable clamping part 43 being located closer to the rotation axis O1 than the fixed clamping part 42 in the non-clamping state, a device located at the side of the movable clamping part 43 at the back side cannot be easily hidden when holding a smartphone with a width which is twice as large as the distance L2 or smaller.

Moreover, since the rotation axis O1 is located in the middle portion of the base part 3 in the Y-direction and the fixed clamping part 42 is overlapped with the end edge 32 of the base part 3 when clamping the smartphone 5 in the Y-direction, a device at the back side cannot be easily hidden by the smartphone 5 at the side of the end edge 32 when holding the smartphone 5 with its vertical orientation. Additionally, when holding the smartphone 5 with a similar width to the base part 3 in a vertical orientation, end edges of the base part 3 and the smartphone 5 at both sides in the Y-direction are flush with each other so that improvement regarding the design can be achieved.

Furthermore, due to the fixed clamping part 42 being located substantially at the same height as the lower end 31 of the base part 3 when clamping the smartphone 5 in the Z-direction, one side of the smartphone 5 can be positioned along the lower end 31 of the base part 3, wherein a device (front panel part 23) located below the base part 3 cannot be easily hidden by the smartphone 5.

Moreover, due to the rotation axis O1 being located in the middle portion of the holding plate part 41 in the Y-direction and the distance L2 being longer than the distance L1, the end edge 411 of the holding plate part 41 after rotation is located above the fixed clamping part 42 before rotation in the Z-direction, wherein a device located below the holding plate part 41 cannot be easily hidden by the holding plate part 41.

Also, due to the fixed clamping part 42 being aligned along the end edge of the smartphone 5 and constituted of two holding claws 421 which are provided so as to freely slide, the smartphone 5 can be clamped stably by sliding the holding claws 421 depending on the size of the smartphone 5. Furthermore, since the two holding claws 421 are individually adjustable in their positions by sliding movement, the two holding claws 421 can be moved to clamp the smartphone 5 so as not to cover operation buttons, such as a power button and a sound volume button located on a side surface of the smartphone 5, and a charge connector connected to a side surface of the smartphone 5 etc.

Moreover, since the base part 3 is accommodated into the device main body 20 with the clamping direction coinciding with the sliding-in-and-out direction when the base part 3 is tilted so as to extend along the sliding-in-and-out direction, the smartphone 5 can be clamped in the up-down direction by drawing the sliding part 11 and the tilting part 12 out of the device main body 20 and changing the standing angle. Thus, it is easy for a user to clamp the smartphone 5 between the fixed clamping part 42 and the movable clamping part 43.

It is to be noted that the present invention is not limited to the above described example, but also includes other configurations which can achieve the objective of the present invention, wherein variations as shown in the following are also included in the present invention.

For example, although it is configured according to the above described example that the fixed clamping part 42 is located so as to be overlapped with the end edge 32 of the base part 3 when clamping the smartphone 5 in the Y-direction and holding it in a vertical orientation, the present invention is not limited to such a configuration. I.e., it is not necessary that the Y-direction dimension of the base part 3 coincides with the width of a smartphone, it is sufficient that, when holding with the vertical orientation, the fixed clamping part 42 is located in such a position that the middle portion of a smartphone with a specified width substantially coincides with the middle portion of the base part 3.

Further, although it is configured according to the above described example that the fixed clamping part 42 is located substantially at the same height as the lower end 31 of the base part 3 when holding the smartphone 5 with a horizontal orientation, the fixed clamping part may be also located in a position sufficiently higher than the lower end 31. With such a configuration, a device at the back side cannot be easily hidden as well. Moreover, when the smartphone is held with the tilting part being tilted downwards after drawing out, a device at the back side cannot be easily hidden if the fixed clamping part is located substantially at the same height as or in a position lower than the upper end of the base part.

Furthermore, although it is configured according to the above described example that the rotation axis O1 is located in the middle portion of the holding plate part 41 in the direction orthogonal to the clamping direction and the distance L2 is longer than the distance L1, the distance L1 and the distance L2 may be substantially equal. Moreover, for example, when a device located below the holding plate part 41 and the smartphone 5 do not display simultaneously, the distance L2 may be smaller than the distance L1.

Further, although according to the above described example, the fixed clamping part 42 is constituted of two holding claws 421 which are freely slidable, the movable clamping part may have a plurality of slidable holding claws. Furthermore, when it is configured that smartphones with various sizes can be held, e.g. when a holding claw has a sufficient width (in a direction along an end edge of the smartphone 5) and/or when a sufficient number of holding claws are provided, the holding claws may be non-slidable.

Moreover, although it is configured according to the above described example that the base part 3 is accommodated into the device main body 20 with the clamping direction coinciding with the sliding-in-and-out direction when the base part 3 is tilted so as to extend along the sliding-in-and-out direction, the base part may be accommodated into the device main body so that the clamping direction is orthogonal to the sliding-in-and-out direction. According to such a configuration, when a plurality of holding claws are aligned in a direction orthogonal to the clamping direction, the holding claws are aligned to each other in the sliding-in-and-out direction, so that interferences with other elements provided at the device main body 20 can be prevented.

Furthermore, although the holding device 1 according to the above described example is configured to hold a smartphone, a held object to be held may be any object which is formed into a rectangular-plate shape. I.e., it may be e.g. a playback device without a telecommunication function which is merely provided for playing a video recorded in a recording medium etc., or an object without a screen. Moreover, when the held object is a mobile device, the mobile device is not limited to a smartphone as in the present example, but also may be e.g. a tablet or a game device.

Further, although the holding device according to the above described example is provided at an instrument panel for a vehicle, the holding device may be provided in transport means other than a vehicle, such as a ship or an airplane, as well as on a wall or furniture inside a building.

With regard to others, although the best configuration, method etc. for implementing the present invention are disclosed in the above description, the present invention is not limited thereto. I.e., although the present invention is particularly shown and described mainly with reference to the specific embodiment, various modifications to the above described examples may be made in shape, material, amount and/or other detailed features by those skilled in the art without departing from the scope of the technical idea and purpose of the present invention. Thus, the description using the above disclosed limitations in shape and/or material etc. is not limiting the present invention, but merely illustrative for better understanding the present invention, and therefore, the present disclosure using element names without a part or all of the limitations in shape and/or material etc. is included in the present invention.

REFERENCE SIGNS LIST

1 Holding device
10 Holding mechanism
11 Sliding part
20 Device main body
3 Base part
31 Lower end
32 End edge
4 Holding part
41 Holding plate part
42 Fixed clamping part
421 Holding claws (Stoppers)
43 Movable clamping part
5 Smartphone (Held object)
O1 Rotation axis (Rotation center)

The invention claimed is:

1. A holding device comprising:
   a holding mechanism configured to hold a held object; and
   a device main body configured to attach the holding mechanism to an object;
   wherein the holding mechanism includes:
      a sliding part supported by the device main body to freely slide in and out of the device main body, and
      a tilting part supported by the sliding part so that a standing angle of the tilting part is changeable, the tilting part including a pair of clamping parts biased to approach each other in order to hold the held object, the tilting part and the pair of clamping parts are configured to be accommodated in the device main body with a clamping direction coinciding with a sliding-in-and-out direction when being tilted to extend along the sliding-in-and-out direction.

2. The holding device according to claim 1,
   wherein the tilting part further includes:
      a holding part including the pair of clamping parts, and
      a base part configured to support the holding part in a freely rotatable manner, and
   wherein the tilting part is configured so that an orientation of the held object being held by the holding part is changeable.

3. The holding device according to claim 2,
wherein at least one of the pair of clamping parts includes a plurality of stoppers which is provided to be freely slidable along an end edge of the held object.

4. The holding device according to claim 3,
wherein the holding mechanism is configured to hold a mobile device as the held object.

5. The holding device according to claim 2,
wherein the holding mechanism is configured to hold a mobile device as the held object.

6. The holding device according to claim 2,
wherein the holding device is configured to be provided at an instrument panel for a vehicle.

7. The holding device according to claim 1,
wherein at least one of the pair of clamping parts includes a plurality of stoppers which is provided to be freely slidable along an end edge of the held object.

8. The holding device according to claim 7,
wherein the holding mechanism is configured to hold a mobile device as the held object.

9. The holding device according to claim 7,
wherein the holding device is configured to be provided at an instrument panel for a vehicle.

10. The holding device according to claim 1,
wherein the holding mechanism is configured to hold a mobile device as the held object.

11. The holding device according to claim 10,
wherein the holding device is configured to be provided at an instrument panel for a vehicle.

12. The holding device according to claim 1,
wherein the holding device is configured to be provided at an instrument panel for a vehicle.

* * * * *